(12) United States Patent
Wada et al.

(10) Patent No.: US 10,935,226 B2
(45) Date of Patent: Mar. 2, 2021

(54) LIGHTING DEVICE AND DISPLAY APPARATUS

(71) Applicant: SHARP KABUSHIKI KAISHA, Sakai (JP)

(72) Inventors: Takeshi Wada, Sakai (JP); Takuya Ohnishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/622,516

(22) PCT Filed: Jun. 6, 2018

(86) PCT No.: PCT/JP2018/021651
§ 371 (c)(1),
(2) Date: Dec. 13, 2019

(87) PCT Pub. No.: WO2018/230407
PCT Pub. Date: Dec. 20, 2018

(65) Prior Publication Data
US 2020/0208824 A1 Jul. 2, 2020

(30) Foreign Application Priority Data
Jun. 13, 2017 (JP) .............................. JP2017-115801

(51) Int. Cl.
| *F21V 29/15* | (2015.01) |
| *F21V 29/503* | (2015.01) |
| *F21V 29/70* | (2015.01) |
| *G02F 1/13357* | (2006.01) |

(52) U.S. Cl.
CPC ............ *F21V 29/15* (2015.01); *F21V 29/503* (2015.01); *F21V 29/70* (2015.01); *G02F 1/133603* (2013.01); *G02F 1/133608* (2013.01); *G02F 2001/133613* (2013.01)

(58) Field of Classification Search
None
See application file for complete search history.

(56) References Cited

U.S. PATENT DOCUMENTS

| 2008/0117361 A1 | 5/2008 | Chun et al. |
| 2012/0081633 A1 | 4/2012 | Chun et al. |
| 2013/0093970 A1 | 4/2013 | Chun et al. |

(Continued)

FOREIGN PATENT DOCUMENTS

| JP | 2002-216525 A | 8/2002 |
| JP | 2010-282911 A | 12/2010 |

*Primary Examiner* — Elmito Breval
(74) *Attorney, Agent, or Firm* — ScienBiziP, P.C.

(57) ABSTRACT

A lighting device includes a first light source unit having a first light source row made up of a plurality of light sources, and a first light source board, onto which the light sources making up the first light source row are mounted, a second light source unit having a second light source row made up of a plurality of light sources, and a second light source board, onto which the light sources making up the second light source row are mounted, and a light guide plate having a plate-like shape and having a first light-incident face where light emitted from the light sources is incident, and a second light-incident face disposed on an opposite side from the first light-incident face where light emitted from the light sources is incident.

12 Claims, 11 Drawing Sheets

(56) References Cited

U.S. PATENT DOCUMENTS

2014/0212086 A1* 7/2014 Sunaga .................. G02B 6/428
                                                    385/14
2016/0091151 A1* 3/2016 Itoi ...................... G02B 6/0023
                                                    362/612

* cited by examiner

FIG. 11
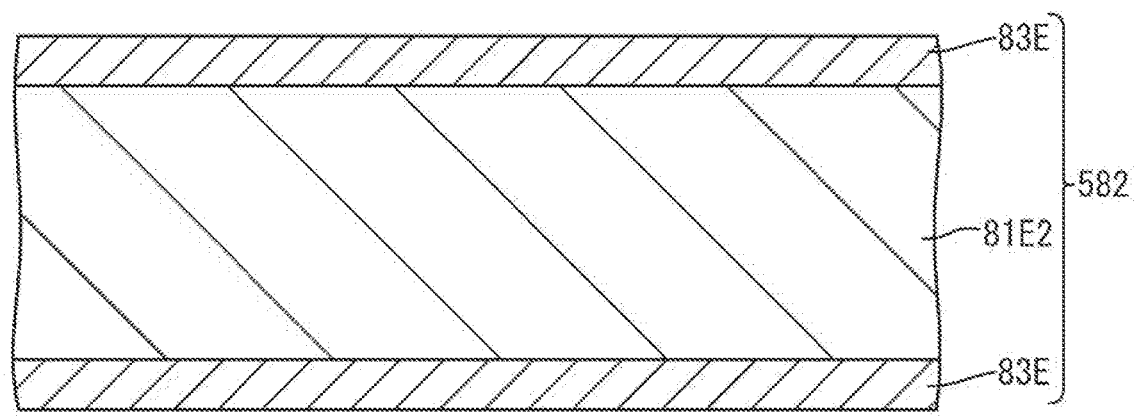
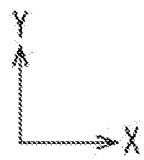

LIGHTING DEVICE AND DISPLAY APPARATUS

TECHNICAL FIELD

The present invention relates to a lighting device and a display apparatus.

BACKGROUND ART

Liquid crystal display apparatuses are provided with a liquid crystal panel, and also with a lighting device (backlight device) that supplies light to the liquid crystal panel. So-called edge-light type (or side-light type) arrangements are known with regard to this type of lighting device, in which multiple LEDs (light emitting diodes) are arranged so as to be aligned in a row in a manner facing an end face of a light guide plate (see PTL 1 for example). Such a lighting device is disposed at a rear face side of the liquid crystal panel, and supplies light spreading in a planar manner toward the rear face of the liquid crystal panel. Note that an optical sheet that imparts an optical effect to emitted light is placed at a light-emitting face side of the light guide plate of the lighting device.

Depending on the usage of the liquid crystal display apparatus, a lighting device that emits high-luminance light is required. Accordingly, there are cases where, to allow light to be incident from not only one end face of the light guide plate but an end face at the opposite side from the one end face, multiple LEDs are arranged so as to be aligned in a row in a manner facing the end face at the opposite side. In liquid crystal display apparatuses that are used in a state where a display face is in an erect state, for example, the lighting device will also be in an erect state, and accordingly multiple LEDs are placed so as to be aligned in a row in a manner facing each of the end face at the upper edge side and the end face at the lower edge side of the erect light guide plate.

CITATION LIST

Patent Literature

PTL 1: Japanese Unexamined Patent Application Publication No. 2002-216525

Technical Problem

There has been a problem that when a liquid crystal display apparatus is used in an erect state as described above, heat tends to collect around the upper edge side of the light guide plate of the lighting device. In the above lighting device, LEDs are placed in a manner facing each of the end face at the upper edge side and the end face at the lower edge side of the light guide plate. Accordingly, around the end face at the upper edge side and around the end face at the lower edge side of the light guide plate are each heated when the LEDs emit light. However, when the lighting device is erect, heat generated at the lower edge side travels to the upper edge side under influence of the chimney effect, and thus heat collects around the upper edge side of the light guide plate, as described above.

When heat concentrates at around the upper edge side of the light guide plate in the lighting device, a great temperature difference is generated between the upper edge side and lower edge side of the light guide plate, and accordingly, of the optical sheet that is overlaid on the light guide plate, a portion that is overlaid on the upper edge side of the light guide plate largely thermally expands. As a result, there have been cases where the optical sheet could not impart an appropriate optical effect to light emitted from the light guide plate, and trouble has occurred such as luminance unevenness in light emitted from the lighting device.

There also is concern that if heat concentrates at around the upper edge side of the light guide plate, problems may occur such as the temperature rating of other members making up the lighting device being exceeded.

SUMMARY OF INVENTION

It is an object of the present invention to provide a lighting device and so forth, where temperature difference between around the upper side and around the lower side of the light guide plate is suppressed when used in an erect state in which light sources are situated at each of the upper side and lower side of the light guide plate.

Solution to Problem

A lighting device according to the present invention includes a first light source unit having a first light source row made up of a plurality of light sources aligned in a row, and a first light source board of relatively low thermal conduction efficiency, onto which the light sources making up the first light source row are mounted, a second light source unit having a second light source row made up of a plurality of light sources aligned in a row, and a second light source board of relatively high thermal conduction efficiency, onto which the light sources making up the second light source row are mounted, and a light guide plate having a plate-like shape and having a first light-incident face including an end face facing the first light source row, where light emitted from the light sources making up the first light source row is incident and a second light-incident face disposed on an opposite side from the first light-incident face and including an end face facing the second light source row, where light emitted from the light sources making up the second light source row is incident.

Also, another lighting device according to the present invention includes a first light source unit having a first light source row made up of a plurality of light sources aligned in a row, and a first light source board onto which the plurality of light sources making up the first light source row are mounted, the first light source unit having a relatively large heat generation amount, a second light source unit having a second light source row made up of a plurality of light sources aligned in a row, and a second light source board onto which the plurality of light sources making up the second light source row are mounted, the second light source unit having a relatively small heat generation amount, and a light guide plate having a plate-like shape and having a first light-incident face including an end face facing the first light source row, where light emitted from the light sources making up the first light source row is incident, and a second light-incident face disposed on an opposite side from the first light-incident face and including an end face facing the second light source row, where light emitted from the light sources making up the second light source row is incident.

Also, another lighting device according to the present invention includes a first light source unit having a first light source row made up of a plurality of light sources aligned in a row, and a first light source board onto which the plurality of light sources making up the first light source row are mounted, the first light source unit having a relatively low thermal dissipation property, a second light source unit having a second light source row made up of a plurality of light sources aligned in a row, and a second light source board onto which the plurality of light sources making up the second light source row are mounted, the second light source unit having a relatively high thermal dissipation property, and a light guide plate having a plate-like shape and having a first light-incident face including an end face facing the first light source row, where light emitted from the plurality of light sources making up the first light source row is incident, and a second light-incident face disposed on an opposite side from the first light-incident face and including an end face facing the second light source row, where light emitted from the light sources making up the second light source row is incident.

Advantageous Effects of Invention

According to the present invention, a lighting device and so forth can be provided, where temperature difference between around the upper side and around the lower side of the light guide plate is suppressed when used in an erect state so that light sources are situated at each of the upper side and lower side of the light guide plate.

BRIEF DESCRIPTION OF DRAWINGS

FIG. 11 is a cross-sectional view of a second LED board provided to the lighting device according to Embodiment 5.

DESCRIPTION OF EMBODIMENTS

Embodiment 1

Figure 1:
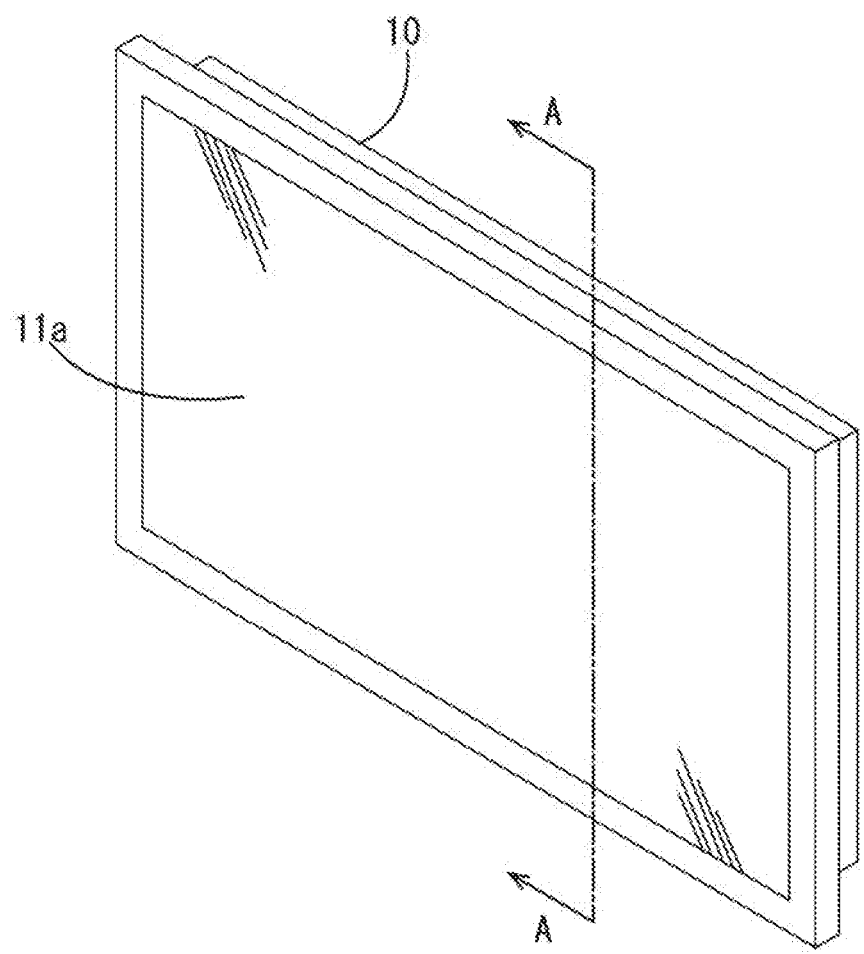
FIG. 1 is a perspective view of a liquid crystal display apparatus according to Embodiment 1.
Figure 2:
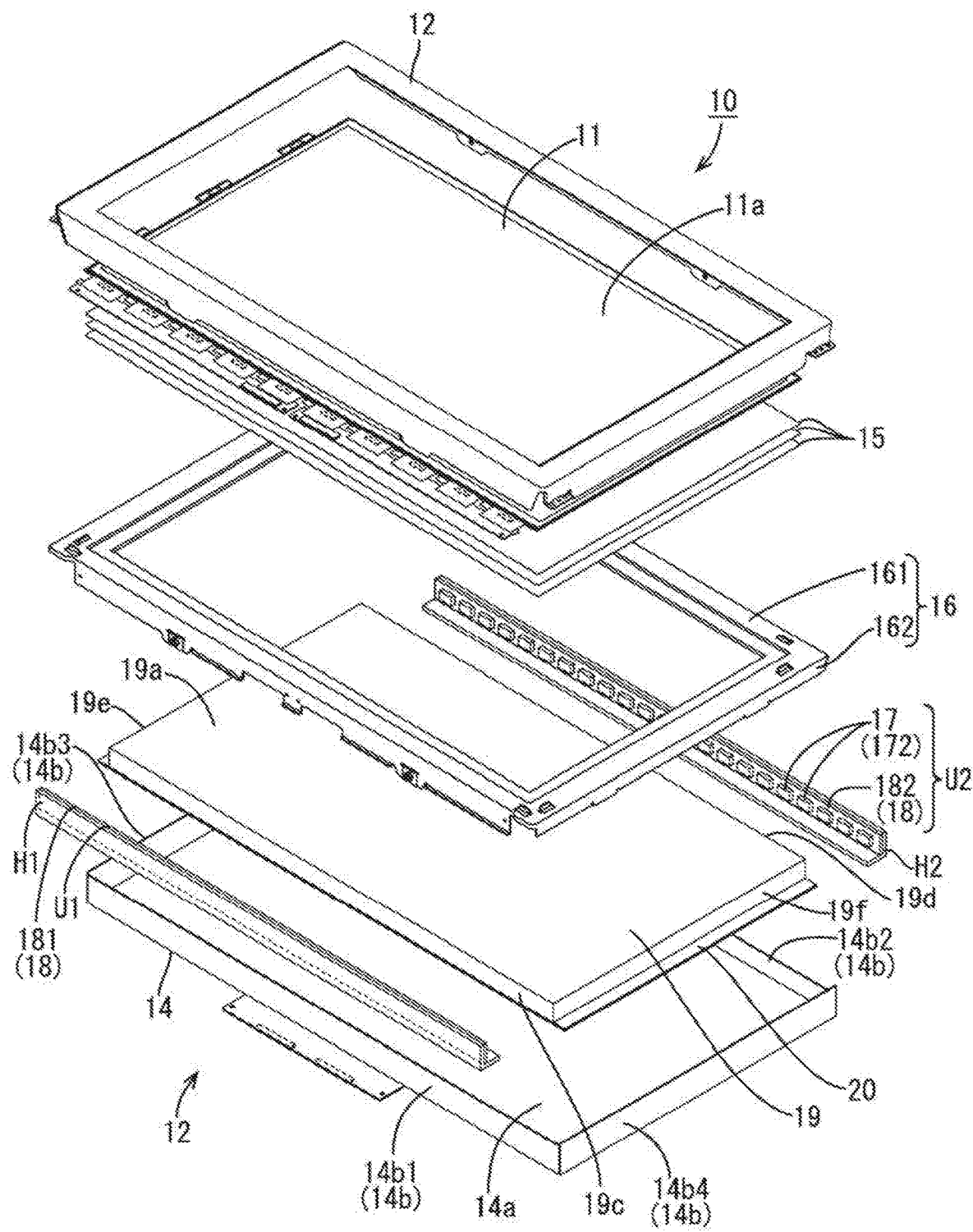
FIG. 2 is a disassembled perspective view of the liquid crystal display apparatus.
Figure 3:
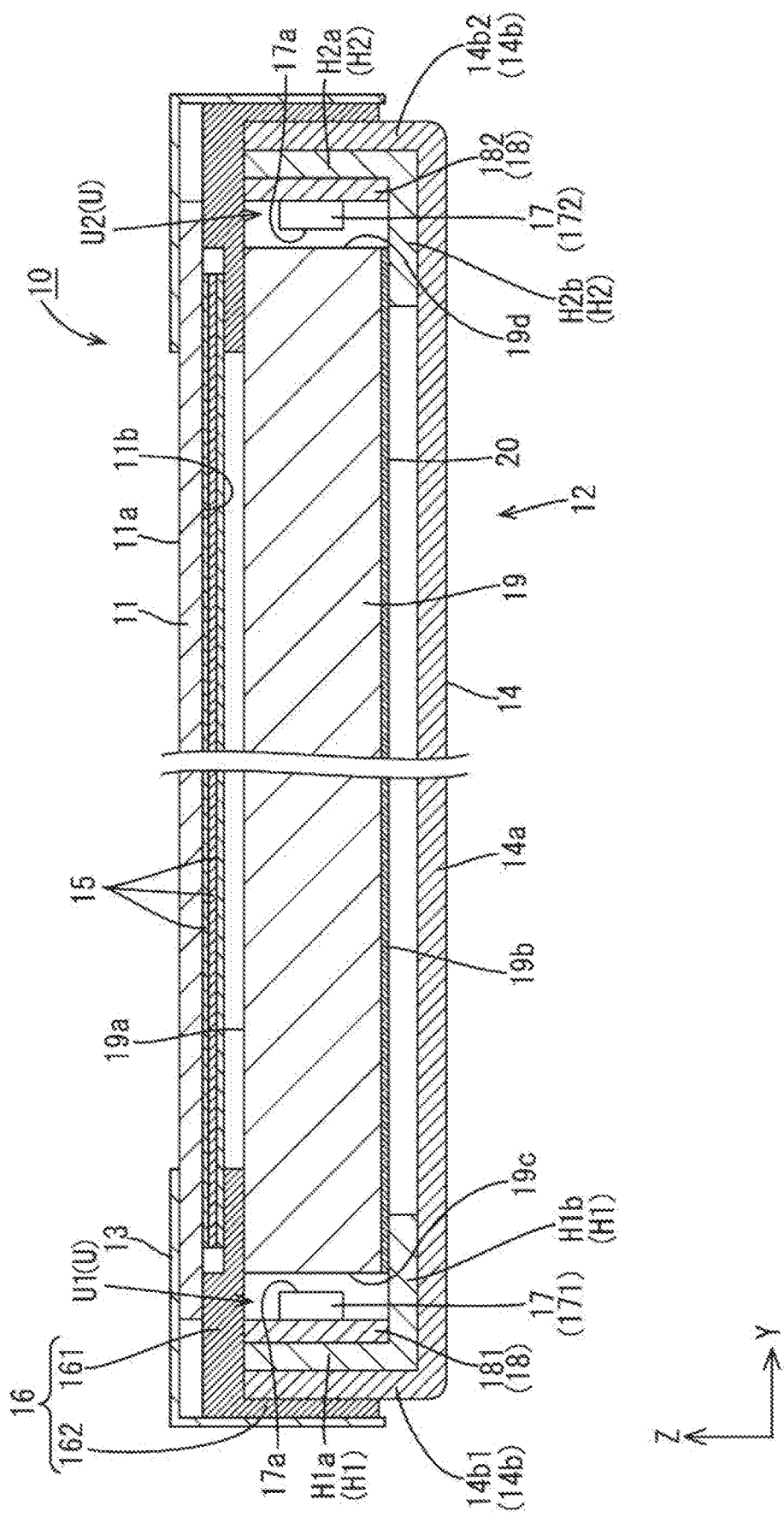
FIG. 3 is a cross-sectional view taken along line A-A in FIG. 1.

A liquid crystal display apparatus 10 provided with a lighting device 12 according to Embodiment 1 of the present invention will be described below with reference to FIG. 1 through FIG. 6. Note that the drawings have the X axis, Y axis, and Z axis illustrated, for convenience of description. FIG. 1 is a perspective view of the liquid crystal display apparatus 10 according to Embodiment 1, FIG. 2 is a disassembled perspective view of the liquid crystal display apparatus 10, and FIG. 3 is a cross-sectional view taken along line A-A in FIG. 1. The liquid crystal display apparatus 10 has an overall rectangular shape that is horizontally long, extending lengthwise in the left-right direction, and is used in an erect state where the short edge sides follow the vertical direction (Y axis direction), as illustrated in FIG. 1.

The liquid crystal display apparatus 10 primarily includes a liquid crystal panel 11 used as a display panel, a lighting device (backlight device) 12 serving as an external light source that supplies light to the liquid crystal panel 11, a frame-like bezel 13 that holds the liquid crystal panel 11 and lighting device 12 and the like, and so forth.

The liquid crystal panel 11 primarily includes a pair of transparent substrates, and a liquid crystal layer interposed and sealed therebetween, and displays images in a visually-recognizable manner on a display face 11a using light emitted from the lighting device 12. The liquid crystal panel 11 has an overall rectangular shape that is horizontally long in plan view. One of the pair of substrates making up the liquid crystal panel 11 is an array substrate, where TFTs (thin film transistors) that are switching devices, pixel electrodes, and so forth, are arranged in a matrix fashion upon a transparent glass substrate. The other substrate is a color filter (hereinafter, OF) substrate, and is made up of color filters of the colors red, green, and blue arranged in a matrix fashion upon a transparent glass substrate.

The lighting device 12 is a device that is disposed on a rear face 11b side of the liquid crystal panel 11 and supplies light toward the liquid crystal panel 11, and is configured to emit white light. The lighting device 12 primarily includes a chassis 14, an optical sheet 15, a frame 16, LED units (light source units) U, a light guide plate 19, a reflecting sheet 20, and so forth, as illustrated in FIG. 2 and FIG.

The lighting device 12 is a so-called edge-light type (or side-light type), where LED units U are arranged in a manner facing each of two end faces 19c and 19d of the light guide plate 19. In the present specification, the LED unit U arranged so as to face the end face 19c of the light guide plate 19 will be referred to as a first LED unit U1, and the LED unit U disposed so as to face the end face 19d of the light guide plate 19 will be referred to as a second LED unit U2. Note that when the first LED unit U1 and second LED unit U2 are to be collectively described, these will be referred to as LED units U.

The chassis 14 in overall has a general shape of a box that is shallow and opens toward the front side, and is made up of a metal plate such as an aluminum plate, electrogalvanized steel plate (SECC), or the like, for example. The chassis 14 has a plate-like bottom portion 14a that has a generally rectangular shape in plan view, in the same way as the liquid crystal panel 11 and so forth, and plate-like side wall portions 14h that rise from the periphery of the bottom portion 14a and encompass the bottom portion 14a. Note that of the side wall portions 14h, a side wall portion which is situated on a long edge side of the bottom portion 14a and is situated on the lower side in a state where the lighting device 12 is erect will be referred to as a side wall portion 14b1. A side wall portion situated on a long edge side of the bottom portion 14a and situated on the upper side in a state where the lighting device 12 is erect will be referred to as a side wall portion 14b2. Also, of the side wall portions 14b, side wall portions disposed on the short edge sides of the bottom portion 14a will be referred to as side wall portions 14b3 and 14b4.

The members such as the LED units U, reflecting sheet 20, light guide plate 19, optical sheet 15, and so forth, are accommodated on the inner side of the chassis 14. Note that boards such as control boards, LED drive boards, and so forth, are attached on the outer side of the chassis 14.

The reflecting sheet 20 is disposed within the chassis 14 so as to cover the front face of the bottom portion 14a. The reflecting sheet 20 is a light-reflecting sheet-like member, and includes white foamed polyethylene terephthalate (an example of a white plastic sheet) or the like for example. The light guide plate 19 is accommodated within the chassis 14, with being placed on the reflecting sheet 20.

The light guide plate 19 includes a synthetic resin material that has a refractive index sufficiently higher than air, is transparent, and has excellent optical transparency (e.g., acrylic resin such as PMMA or the like, polycarbonate resin, or the like). The light guide plate 19 is made up of a plate-like member that has a generally rectangular shape in plan view, in the same way as the liquid crystal panel 11 and so forth, and is accommodated within the chassis 14 with a front face (plate face at the front side) 19a thereof facing the rear face 11b side of the liquid crystal panel 11, and a rear face (opposite face) 19b facing the reflecting sheet 20.

The front face 19a of the light guide plate 19 is a light-emitting face 19a that emits light toward the liquid crystal panel 11 side. The optical sheet 15 is disposed between the light-emitting face 19a and liquid crystal panel 11, with being placed on the frame 16. Of the pair of long-edge-side end faces 19c and 19d that the light guide plate 19 has within the chassis 14, the one end face 19c situated at the lower side in a state where the lighting device 12 is erect faces the first LED unit. U1, and serves as a light-incident face 19c where light from the first LED unit U1 is incident. Also, the other end face 19d that is situated at the upper side in the same state faces the second LED unit. U2, and serves as a light-incident face 19d where light from the second LED unit U2 is incident. Note that of a pair of short-edge-side end faces 19e and 19f that the light guide plate 19 has within the chassis 14, one end face 19e faces a side wall portion 14b3, and the other end face 19f faces a side wall portion 14b4.

A light-reflecting scattering pattern is formed on the rear face 19b of the light guide plate 19, having a function of reflecting or scattering light incident to the interior of the light guide plate 19 from the light-incident face 19c and light-incident face 19d, so as to be directed toward the light-emitting face 19a side. The light-reflecting/scattering pattern is configured of multiple coating films printed as dots, or the like, for example.

The frame 16 has an overall frame form (picture-frame form) that covers the peripheral edge portion of the light guide plate 19 from the front side, and is assembled to the chassis 14 at the opening portion from the front side. The frame 16 includes synthetic resin, for example. The frame 16 has a main frame portion 161 that has a frame form in plan view, with an inner rim side thereof being placed from the front side against the peripheral edge portion of the light guide plate 19 in a state of being accommodated within the chassis 14, and an upright wall portion 162 that extends from the main frame portion 161 toward the bottom portion 14a side of the chassis 14, and that is disposed on the outer side of the side wall portions 14b of the chassis 14.

The main frame portion 161 has a frame form that has a predetermined width, so that the inner rim side thereof overlays the peripheral edge portion of the light guide plate 19, and the outer rim side thereof overlays an upper end portion of the side wall portions 14b of the chassis 14. The rear face of the inner rim side of the main frame portion 161 is placed against the peripheral edge portion of the light guide plate 19 from the front side. The front face of the main frame portion 161 at the inner rim side is designed to be sunken in comparison with the front face of the outer rim side, with the edge portion of the optical sheet. 15 being placed in the sunken portion. Protrusions, omitted from illustration, are provided on the front face of the inner rim side of the main frame portion 161, and holes formed in the edge portion of the optical sheet 15 are fit to these protrusions, whereby the optical sheet 15 is supported by the main frame portion 161.

The upright wall portion 162 has a plate-like form that extends from the rear face of the outer rim side of the main frame portion 161 toward the bottom portion 14a side of the chassis 14, and also faces the outer peripheral faces of the side wall portions 14b of the chassis 14. Note that the upright wall portion 162 has an overall frame form that encompasses the side wall portions 14b.

The first LED unit (first light source unit) U1 is a device that radiates light toward the light-incident face 19c at the lower side of the light guide plate 19, and in overall has an elongated form extending following the long-edge direction of the light guide plate 19. The first. LED unit U1 has a first LED row (first light source row) 171 made up of multiple LEDs 17 aligned in a row (one row in the case of the present embodiment), and a first. LED board (first light source board) 181 on which the multiple LEDs 17 making up the first LED row 171 are mounted.

The second LED unit (second light source unit) U2 is a device that radiates light toward the light-incident face 19d at the upper side of the light guide plate 19, and in overall has an elongated form extending following the long-edge direction of the light guide plate 19. The second. LED unit U2 has a second LED row (second light source row) 172 made up of multiple LEDs 17 aligned in a row (one row in the case of the present embodiment), and a second LED board (second light source board) 182 on which the multiple LEDs 17 making up the second LED row 172 are mounted.

Note that when the first LED board 181 and second LED board 182 are to be collectively described, these will be referred to as LED boards (light source boards) 18.

The LEDs 17 used in the LED units U1 and U2 are so-called top-emitting types (top view types), and are surface-mounted on the LED boards 18 with light-emitting faces 17a facing the opposite side from the side of the LED boards 18. The LEDs 17 are configured to primarily include an LED element (LED chip, light-emitting element) that is a light-emission source, a sealant (transparent resin material) that seals the LED element, and a case (container, housing) in which the LED element is accommodated and also filled with the sealant. The LEDs 17 according to the present embodiment are each configured so as to emit white light.

The first LED board 181 has a band-like form that extends following the lower-side long edge (light-incident face 19 of the light guide plate 19. Multiple LEDs 17 are mounted on the front face side of this first LED board 181, aligned in a row following the longitudinal direction. The second LED board 182 also has a band-like form that extends following the upper-side long edge (light-incident face 19d) of the light guide plate 19. Multi e LEDs 17 are mounted on the front face side of this second LED board 182, aligned in a row following the longitudinal direction. The LED boards 18 will be described in detail later.

The first LED unit U1 is installed within the chassis 14 so as to follow the side wall portion 14b1, in a state of being attached to a first thermal dissipation member H1. The first thermal dissipation member H1 is an elongated member including metal and has a generally L-shaped cross-sectional shape. The first thermal dissipation member H1 has a plate-like first upright wall portion H1a that is perpendicularly erected as to the bottom portion 14a of the chassis 14 and to which the first LED unit U1 is attached, and a plate-like first placement portion H1b that is placed on the bottom portion 14a and extends from the lower end of the first upright wall portion H1a following the front face of the bottom portion 14a. The first. LED board 181 of the first. LED unit U1 is adhered to the first upright wall portion H1a of the first thermal dissipation member H1 by way of an unshown two-sided adhesive member (e.g., two-sided adhesive tape). When the first thermal dissipation member H1 is installed within the chassis 14, the first upright wall portion. H1a is attached in tight contact with the side wall portion 14b1 of the chassis 14. Also, when the first thermal dissipation member H1 is installed within the chassis 14, the first placement portion H1b is attached in tight contact with the bottom portion 14a of the chassis 14. Note that in the chassis 14, the end portion of the light guide plate 19 at the light-incident face 19c side, and the end portion of the reflecting sheet 20 laid thereunder, are placed on the first placement portion H1b f the first thermal dissipation member H1. Further, the light-incident face 19c of the light guide plate 19 faces the light-emitting faces 17a of the LEDs 17 (first. LED row 171) of the first LED unit U1 attached to the first upright wall portion H1a of the first thermal dissipation member H1. A slight gap is provided between the light-incident face 19c and the light-emitting faces 17a.

The second LED unit U2 is installed within the chassis 14 so as to follow the side wall portion 14b2, in a state of being attached to a second thermal dissipation member H2. The second thermal dissipation member H2 is an elongated member including metal and has a generally L-shaped cross-sectional shape, in the same way as the first thermal dissipation member H1. The second thermal dissipation member H2 has a plate-like second upright wall portion H2a that is perpendicularly erected as to the bottom portion 14a of the chassis 14 and to which the second LED unit U2 is attached, and a plate-like second placement portion H2b that is placed on the bottom portion 14a and extends from the lower end of the second upright wall portion H2a following the front face of the bottom portion 14a. The second LED board 182 of the second LED unit U2 is adhered to the second upright wall portion H2a of the second thermal dissipation member H2 by way of an unshown two-sided adhesive member (e.g., two-sided adhesive tape). When the second thermal dissipation member H2 is installed within the chassis 14, the second upright wall portion H2a is attached in tight contact with the side wall portion 14b2 of the chassis 14. Also, when the second thermal dissipation member H2 is installed within the chassis 14, the second placement portion H2b is attached in tight contact with the bottom portion 14a of the chassis 14. Note that in the chassis 14, the end portion of the light guide plate 19 at the light-incident face 19d side, and the end portion of the reflecting sheet 20 laid thereunder, are placed on the second placement portion H2b of the second thermal dissipation member H2. Further, the light-incident face 19d of the light guide plate 19 faces the Eight-emitting faces 17a of the LEDs 17 (second LED row 172) of the second LED unit U2 attached to the second upright wall portion H2a of the second thermal dissipation member H2. A slight gap is provided between the light-incident face 19d and the light-emitting faces 17a.

Figure 4:
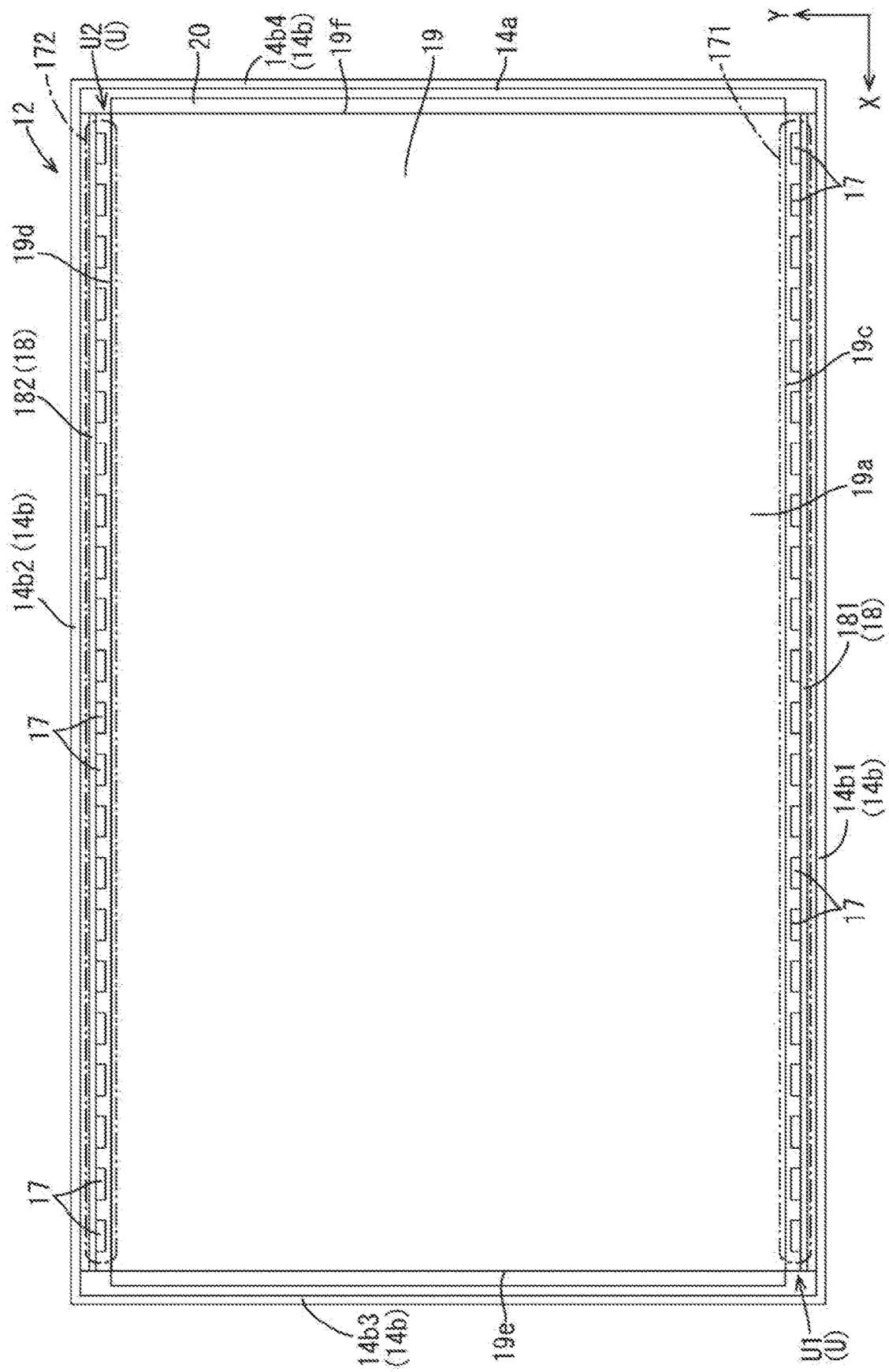
FIG. 4 is a plan view of a lighting device.

FIG. 4 is a plan view of the lighting device 12. Note that FIG. 4 depicts the lighting device 12 in a state where the frame 16, optical sheet 15, and so forth have been removed, for the sake of convenience in description. The first LED unit U1 and second LED unit U2 are disposed facing each other within the chassis 14 with the light guide plate 19 in between, as illustrated in FIG. 4. When the lighting device 12 is used in an erect state, the first LED unit. U1 that faces the light-incident face 19c is situated at the lower side, and the second LED unit U2 that faces the light-incident face 19d is situated at the upper side, as illustrated in FIG. 1.

The multiple LEDs 17 on the first LED board 181 (the multiple LEDs 17 making up the first LED row 171) are arrayed equidistantly following the long-edge direction (left-right direction) of the light guide plate 19, as illustrated in FIG. 4. The multiple LEDs 17 on the second LED board 182 (the multiple LEDs 17 making up the second LED row 172) also are arrayed equidistantly following the long-edge direction (left-right direction) of the light guide plate 19. The first LED unit. U1 and second LED unit U2 both have LEDs 17 of the same type mounted in the case of the present embodiment, with the current supplied to the LEDs 17 (the brightness of the LEDs 17), the amount of heat generated at the LEDs 17, and so forth, also being the same. Further, the first LED unit U1 and second LED unit U2 have the same count of LEDs 17 in the case of the present embodiment.

The optical sheet 15 has a horizontally long generally-rectangular shape in plan view, in the same way as the liquid crystal panel 11 and so forth. The optical sheet 15 is disposed between the light-emitting face 19a of the light guide plate 19 and the rear face 11b of the liquid crystal panel 11, with the peripheral edge portion thereof being placed on the main frame portion 161 of the frame 16 from the front side. The optical sheet 15 has a function of transmitting light emitted from the light guide plate 19 to the liquid crystal panel 11 side, while imparting a predetermined optical effect thereto. The optical sheet 15 is made up of multiple sheets being layered. Specific examples of sheets making up the optical sheet 15 include diffusing sheets, lens sheets, reflective polarizing sheets, and so forth. Note that the optical sheet 15 includes a transparent plastic material.

Figure 5:
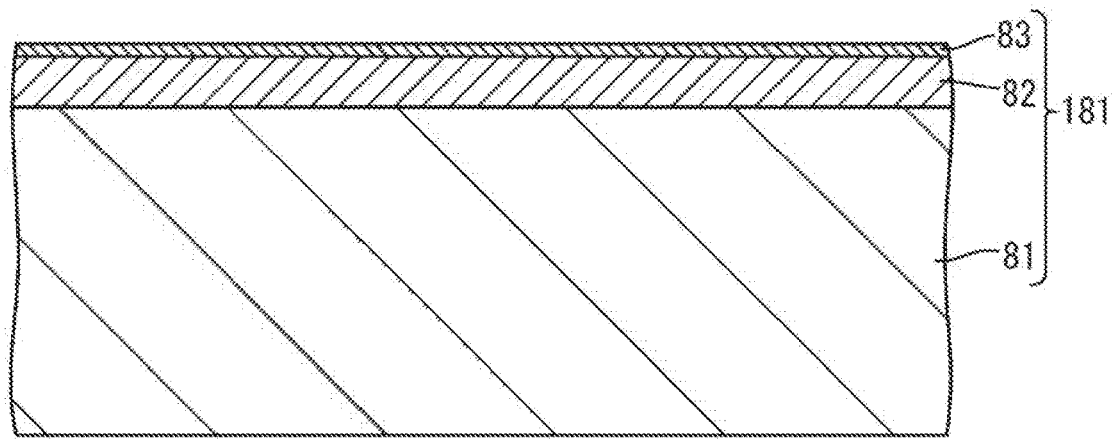
FIG. 5 is a cross-sectional view of a first LED board.

Next, the first LED board 181 and second LED board 182 will be described in detail. FIG. 5 is a cross-sectional view of the first LED board 181. The first LED board 181 has a first support substrate 81, a first insulating layer 82 formed on the first support substrate 81, and a first wiring portion 83 formed on the first insulating layer 82.

The first support substrate 81 includes a strip-like member that has excellent thermal conductance (thermal dissipation property) while securing rigidity of the first LED board 181. The first support substrate 81 is a metal substrate including metal or metal alloy, such as an alloyed aluminum substrate (A5052) for example. The first insulating layer 82 is a coating film including a synthetic resin, and is formed so as to cover the surface of the first support substrate 81. The first wiring portion 83 includes patterned metal foil (e.g., copper foil or the like) and is electrically connected to the LEDs 17 making up the first LED row 171.

Figure 6:
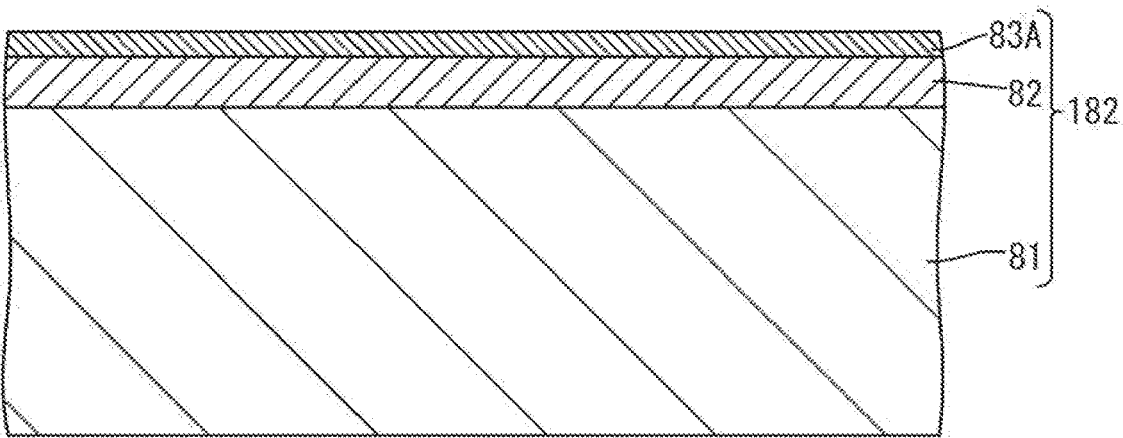
FIG. 6 is a cross-sectional view of a second LED board.

FIG. 6 is a cross-sectional view of the second LED board 182. The second LED board 182 has a second support substrate 81, a second insulating layer 82 formed on the second support substrate 81, and a second wiring portion 83A formed on the second insulating layer 82. The second LED board 182 is the same as the first LED board 181 (same materials, same dimensions, etc.) other than the thickness of the second wiring portion 83A being larger than the first wiring portion 83.

In the case of the present embodiment, the first wiring portion 83 of the first LED board 181 includes copper foil that is 18 m thick, and the second wiring portion 83A of the second LED board 182 includes copper foil that is 35 μm thick.

In the liquid crystal display apparatus 10 that has a configuration such as described above, the LEDs 17 of the LED units U of the lighting device 12 emit light (are lit) at the time of displaying an image on the display face 11a of the liquid crystal panel 11. When the LEDs 17 emit light, light is incident into the light guide plate 19 from the light-incident face 19c of the light guide plate 19 situated at the lower side and the light-incident face 19d situated at the upper side. The incident light advances through the light guide plate 19 while being reflected and so forth by the reflecting sheet 20 applied to the rear side of the light guide plate 19 and the light-reflecting/scattering pattern formed on the rear face 19b of the light guide plate 19 and so forth, and is emitted from the light-emitting face 19a that is the plate face at the front side thereof. Light emitted from the light-emitting face 19a is transmitted through the optical sheet 15 and becomes light spreading in a planar manner, and illuminates the rear face 11b of the liquid crystal panel 11. The liquid crystal panel 11 then uses the light from the lighting device 12 to display an image on the display face 11a.

Temperature difference between the lower edge side (light-incident face 19c side) of the light guide plate 19 where the first LED unit U1 is situated and the upper edge side (light-incident face 19d side) of the light guide plate 19 where the second LED unit U2 is situated is suppressed in the liquid crystal display apparatus 10 according to the present embodiment when used in an erect state where the display face 11a follows the vertical direction. When the LEDs 17 are driven to be lit, the first LED unit U1 generates heat, and the lower edge side (light-incident face 19c side) of the light guide plate 19 is also heated by the generated heat. Also, when the LEDs 17 of the first LED unit U1 generate heat, this heat transmits through the lighting device 12 by the chimney effect, and also heats the upper edge side (light-incident face 19d side) of the light guide plate 19. Note that the upper edge side (light-incident face 19d side) of the light guide plate 19 is also heated by heat generated at the LEDs 17 of the second LED unit U2.

However, in the second LED board 182 of the second LED unit U2, the second wiring portion 83A including copper foil is thicker than the first wiring portion 83 of the first LED board 181 as described above, and accordingly thermal conduction efficiency (thermal dissipation efficiency) of the second LED board 182 is higher than the first LED board 181, and the thermal dissipation property of the configuration is good. Accordingly, when the LEDs 17 of the second LED unit U2 are driven to be lit, heat generated at the LEDs 17 can be efficiently relocated from the second LED board 182 to the outside (second thermal dissipation member H2, chassis 14). Thus, even if heat generated at the first LED unit U1 side situated below travels upwards by the chimney effect, heat generated at the second LED unit U2 situated above is efficiently dissipated to the outside, and accordingly temperature difference between the lower edge side and upper edge side of the light guide plate 19 is suppressed as described above. As a result, thermal expansion difference of the optical sheet 15 at the lower edge side and upper edge side is suppressed, and occurrence of wrinkles and warping of the optical sheet 15 can be suppressed.

For example, in a case where the length of the optical sheet 15 is 720 mm and temperature difference of 15° C. occurs between the lower edge side and upper edge side of the optical sheet 15, if the linear expansion coefficient of the optical sheet 15 is $9 \times 10^{-5}$, the dimensional difference between the lower edge side and upper edge side due to thermal expansion will be approximately 1 mm ($=9 \times 10^{-5} \times$ 720×1). There is concern that the optical sheet 15 thermally expanded will interference with other members or the like, and wrinkles and warping will occur. The lighting device 12 according to the present embodiment can suppress occurrence of large dimensional difference of the optical sheet 15 due to such thermal expansion.

Embodiment 2

Figure 7:
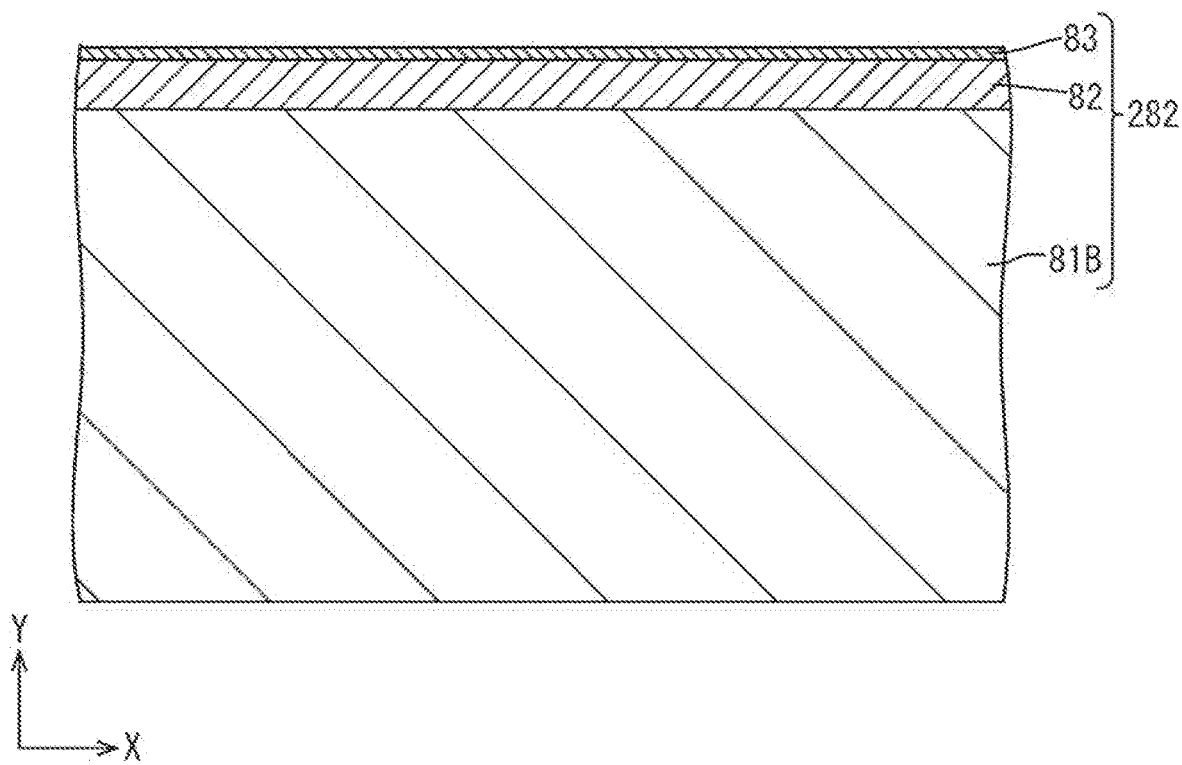
FIG. 7 is a cross-sectional view of a second LED board provided to a lighting device according to Embodiment 2.

Next, a lighting device according to Embodiment 2 will be described with reference to FIG. 7. FIG. 7 is a cross-sectional view of a second LED board 282 provided to the lighting device according to Embodiment 2. The basic configuration of the lighting device according to the present embodiment is the same as that of the lighting device 12 according to Embodiment 1, with only the configuration of the second LED board 282 provided to the second LED unit differing from that of Embodiment 1. Although the basic configuration of the second LED board 282 according to the present embodiment is the same as that of the first LED board (first LED board 181 according to Embodiment 1), the thickness of a second support substrate 81B is set so as to be larger than that of the first LED board (first LED board 181 according to Embodiment 1). The second insulating layer 82 and second wiring portion 83 according to the present embodiment each have the same configuration as the first insulating layer and first wiring portion of the first LED board. The thickness of the first support substrate (alloyed aluminum substrate) of the first LED board is 1.0 mm, and the thickness of the second support substrate (alloyed aluminum substrate) 81B of the second LED board 282 is 1.5 mm, in the case of the present embodiment. Note that the first support substrate and the second support substrate both include aluminum alloy (an example of a metal material) that has excellent thermal conductance. The thickness of the second support substrate 81B in the second LED board 282 is set so as to be larger than that of the first support substrate of the first LED board, as described above, and accordingly the second LED board 282 disposed at the upper edge side of the light guide plate has higher thermal conduction efficiency (thermal dissipation efficiency) than the first LED board disposed at the lower edge side of the light guide plate, and has a configuration with an excellent thermal dissipation property. Accordingly, temperature difference between the lower edge side and upper edge side of the light guide plate is suppressed in the lighting device according to the present embodiment as well, in the same way as in the Embodiment 1, when used in an erect state.

Embodiment 3

Figure 8:
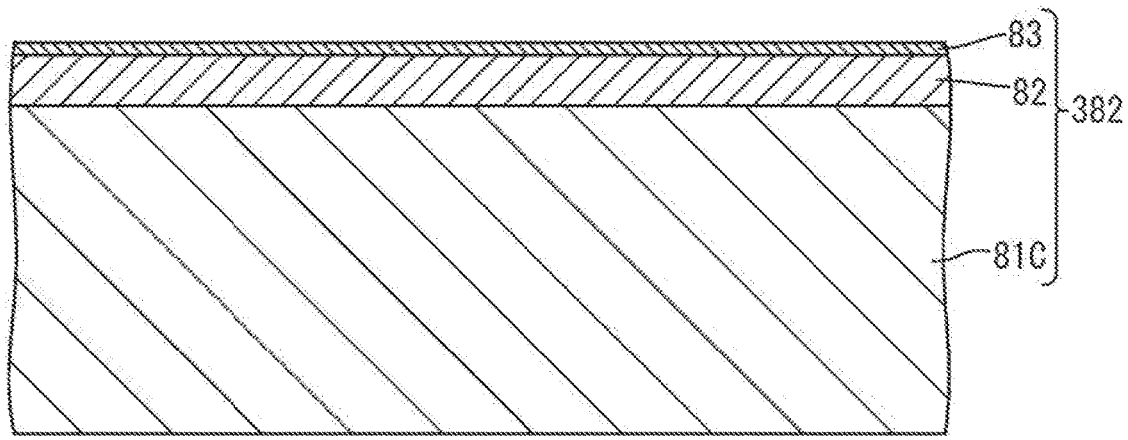
FIG. 8 is a cross-sectional view of a second LED board provided to a lighting device according to Embodiment 3.

Next, a lighting device according to Embodiment 3 will be described with reference to FIG. 8. FIG. 8 is a cross-sectional view of a second LED board 382 provided to the lighting device according to Embodiment 3. The basic configuration of the lighting device according to the present embodiment is the same as that of the lighting device 12 according to Embodiment 1, with only the configuration of the second LED board 382 that the second LED unit is provided with differing from that of Embodiment 1. Although the basic configuration of the second LED board 382 according to the present embodiment is the same as that of the first LED board (first LED board 181 according to Embodiment 1), the material making up a second support substrate 81C is a pure aluminum material (e.g., A1050, A1070, etc.), and accordingly, a material that has higher thermal conductivity than the material used for the first support substrate of the first LED board (alloyed aluminum substrate) is used. The first insulating layer 82 and second wiring portion 83 according to the present embodiment each have the same configuration as the first insulating layer and first wiring portion of the first LED board. The thermal conductivity of the material making tip the second support substrate 81C in the second LED board 382 according to the present embodiment is set so as to be higher than that of the first support substrate of the first LEI) board, as described above, and accordingly the second LED board 382 disposed at the upper edge side of the light guide plate has higher thermal conduction efficiency (thermal dissipation efficiency) than the first LED board disposed at the lower edge side of the light guide plate, and has a configuration with an excellent thermal dissipation property. Accordingly, temperature difference between the lower edge side and upper edge side of the light guide plate is suppressed in the lighting device according to the present embodiment as well, in the same way as in the Embodiment 1, when used in an erect state.

Embodiment 4

Figure 9:
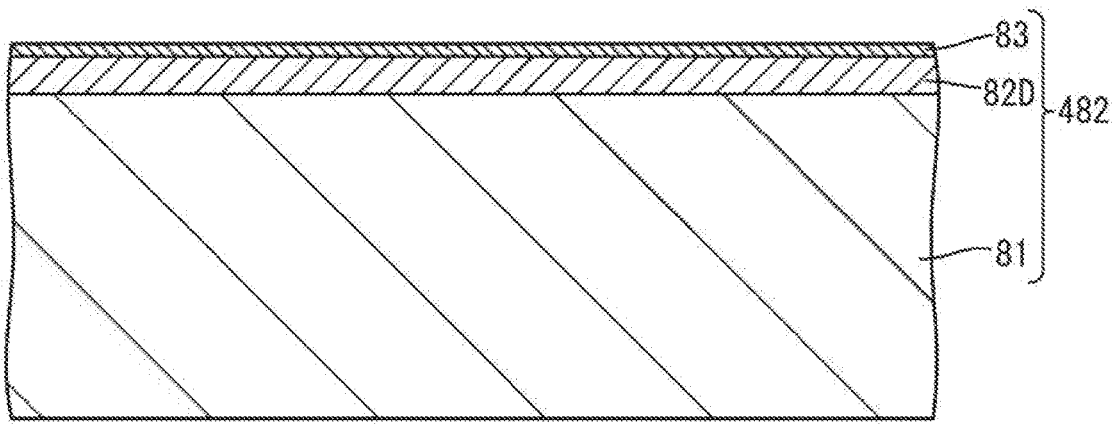
FIG. 9 is a cross-sectional view of a second LED board provided to a lighting device according to Embodiment 4.

Next, a lighting device according to Embodiment 4 will be described with reference to FIG. 9. FIG. 9 is a cross-sectional view of a second LED board 482 provided to the lighting device according to Embodiment 4. The basic configuration of the lighting device according to the present embodiment is the same as that of the lighting device 12 according to Embodiment 1, with only the configuration of the second LED board 482 that the second LED unit is provided with differing from that of Embodiment 1. Although the basic configuration of the second LED board 482 according to the present embodiment is the same as that of the first LED board (first LED board 181 according to Embodiment 1), the thickness of a second insulating layer 82D is set so as to be smaller than that of the first insulating layer of the first LED board. The first insulating layer 81 and second wiring portion 83 according to the present embodiment each have the same configuration as The first insulating layer 81 and first wiring portion 83 of the first LED board. The thickness of the first insulating layer of the first LED board is 100 μm, and the thickness of the second insulating layer 82D of the second LED board 482 is 75 μm, in the case of the present embodiment. The thickness of the second insulating layer 82D in the second LED board 482 is set so as to be smaller than the thickness of the first insulating layer of the first LED board, as described above, and accordingly the second LED board 482 disposed at the upper edge side of the light guide plate has lower thermal resistance than the first LED board disposed at the lower edge side of the light guide plate, and has a configuration with an excellent thermal dissipation property. Accordingly, temperature difference between the lower edge side and upper edge side of the light guide plate is suppressed in the lighting device according to the present embodiment as well, in the same way as in the Embodiment 1, when used in an erect state.

Embodiment 5

Figure 10:
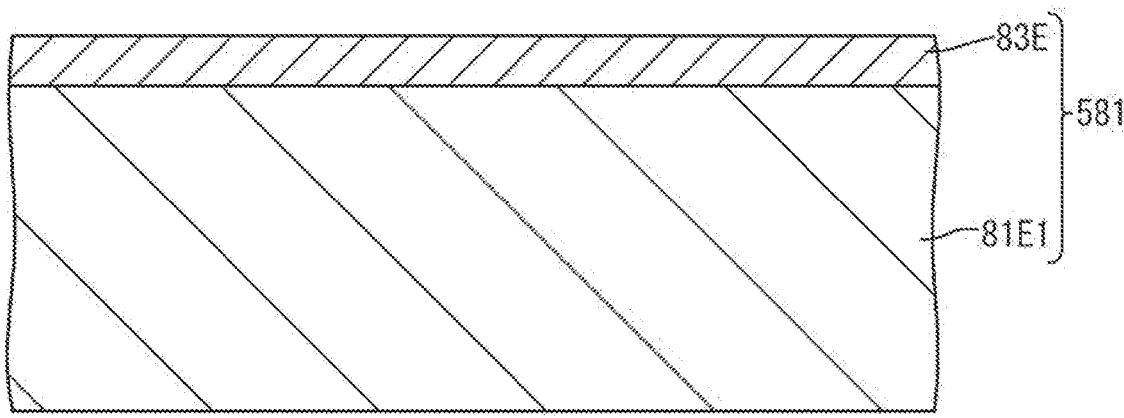
FIG. 10 is a cross-sectional view of a first LED board provided to a lighting device according to Embodiment 5.

Next, a lighting device according to Embodiment 5 will be described with reference to FIG. 10 and FIG. 11. FIG. 10 is a cross-sectional view of a first LED board provided to the lighting device according to Embodiment 5, and FIG. 11 is a cross-sectional view of a second LED board provided to the lighting device according to Embodiment 5. The basic configuration of the lighting device according to the present embodiment is the same as that of the lighting device 12 according to Embodiment 1, with a first LED board 581 of the first LED unit and a second LED board 582 of the second LED unit differing from Embodiment 1. The thickness (total thickness) of the first LED board 581 and the thickness (total thickness) of the second LEI) board 582 according to the present embodiment are set to be the same. The first LED board 581 according the present embodiment is a printed circuit board (single-sided board) that is provided with a first support substrate 81E1 formed of an insulating synthetic resin, and a single-layer wiring portion 83E formed on the first support substrate 81E1. The wiring portion 83E is made up of patterned metal foil (e.g., copper foil) and is electrically connected to the LEDs that make up the first LED row. Further, the second LED board according to the present embodiment is a printed circuit board (double-sided board) that is provided with a second support substrate 81E2 formed of an insulating synthetic resin, and wiring portions 83E formed on each of both sides of the second support substrate 81E2. The second support substrate 81E2 includes the same material as the first support substrate 81E1, but the thickness is smaller than that of the first support substrate 81E1. The second LED board 582 also has two layers of the wiring portion 83E. That is to say, the second LED board 582 overall has a multilayer wiring portion 83E. Note that the thickness of the wiring portion 83E per layer in the second LED board 582 is set so as to be the same as the thickness of the wiring portion 83E of the first LED board 581. The proportion of the multilayer (two-layer) wiring portion 83E in the second LED board 582 is larger than the proportion of the single-layer (one-layer) wiring portion 83E in the first LED board 581 in the case of the present embodiment, and accordingly the second LED board 582 disposed at the upper edge side of the light guide plate has higher thermal conduction efficiency (thermal dissipation efficiency) than the first LED board 581 disposed at the lower edge side of the light guide plate, and has a configuration with an excellent thermal dissipation property. Accordingly, temperature difference between the lower edge side and upper edge side of the light guide plate is suppressed in the lighting device according to the present embodiment as well, in the same way as in the Embodiment 1, when used in an erect state.

Embodiment 6

Figure 12:
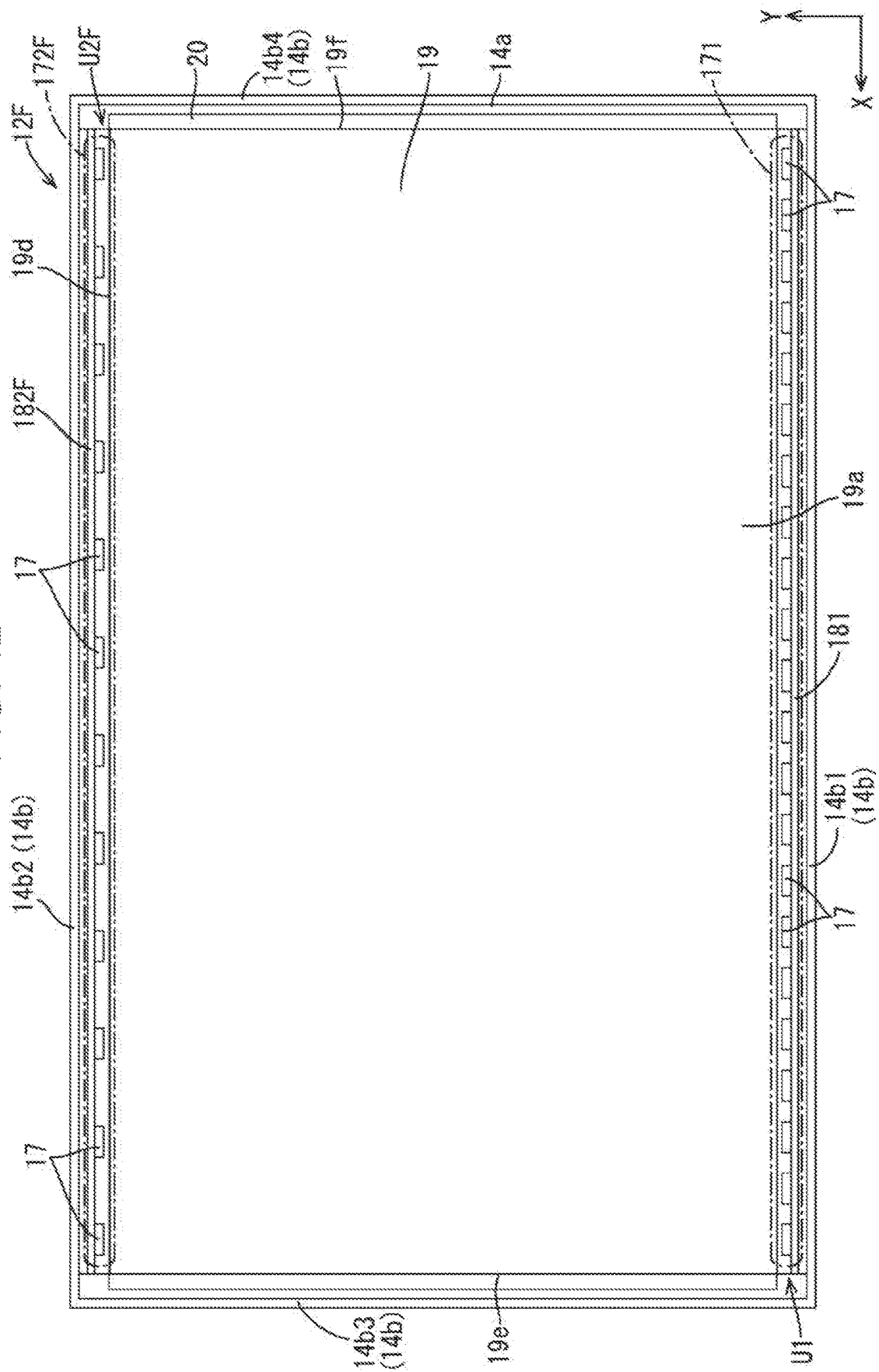
FIG. 12 is a plan view of a lighting device according to Embodiment 6.

Next, a lighting device according to Embodiment. 6 will be described with reference to FIG. 12. FIG. 12 is a plan view of a lighting device 12F according to Embodiment 6. FIG. 12 depicts the lighting device 12F in a state where the frame, optical sheet, and so forth have been removed, for the sake of convenience in description. The lighting device 12F according to the present embodiment differs from the lighting device 12 according to Embodiment 1 described above with regard to the configuration of a second LED unit U2F. The count of LEDs 17 making up the second LED row 172 in the second LED unit U2F according to the present embodiment is smaller as compared to in the first LED row 171 of the first LED unit U1. In the present embodiment, the heat generation amount from the second LED unit U2F is made to be smaller than the first LED unit U1, by reducing the count of LEDs 17 used at the upper edge side of the light guide plate 19 (light-incident face 19d side) that tends to become hot. The count of LEDs 17 used in the second LED row 172F preferably is less than the LEDs 17 of the first LED row 171, within a level where no luminance unevenness in the light emitted from the lighting device 12F occurs.

Note that the effect of having reduced the LEDs 17 of the second LED row 172F (reduced luminance) can be suppressed by appropriately setting the light-reflecting/scattering pattern formed on the rear face 19b side of the light guide plate 19. An arrangement may be made where temperature difference between the lower edge side and upper edge side of the light guide plate 19 is suppressed by reducing the count of LEDs 17 supplying light to the light-incident face 19d at the upper edge side of the light guide plate 19 to reduce heat generation sources, as in the present embodiment.

Embodiment 7

Figure 13:
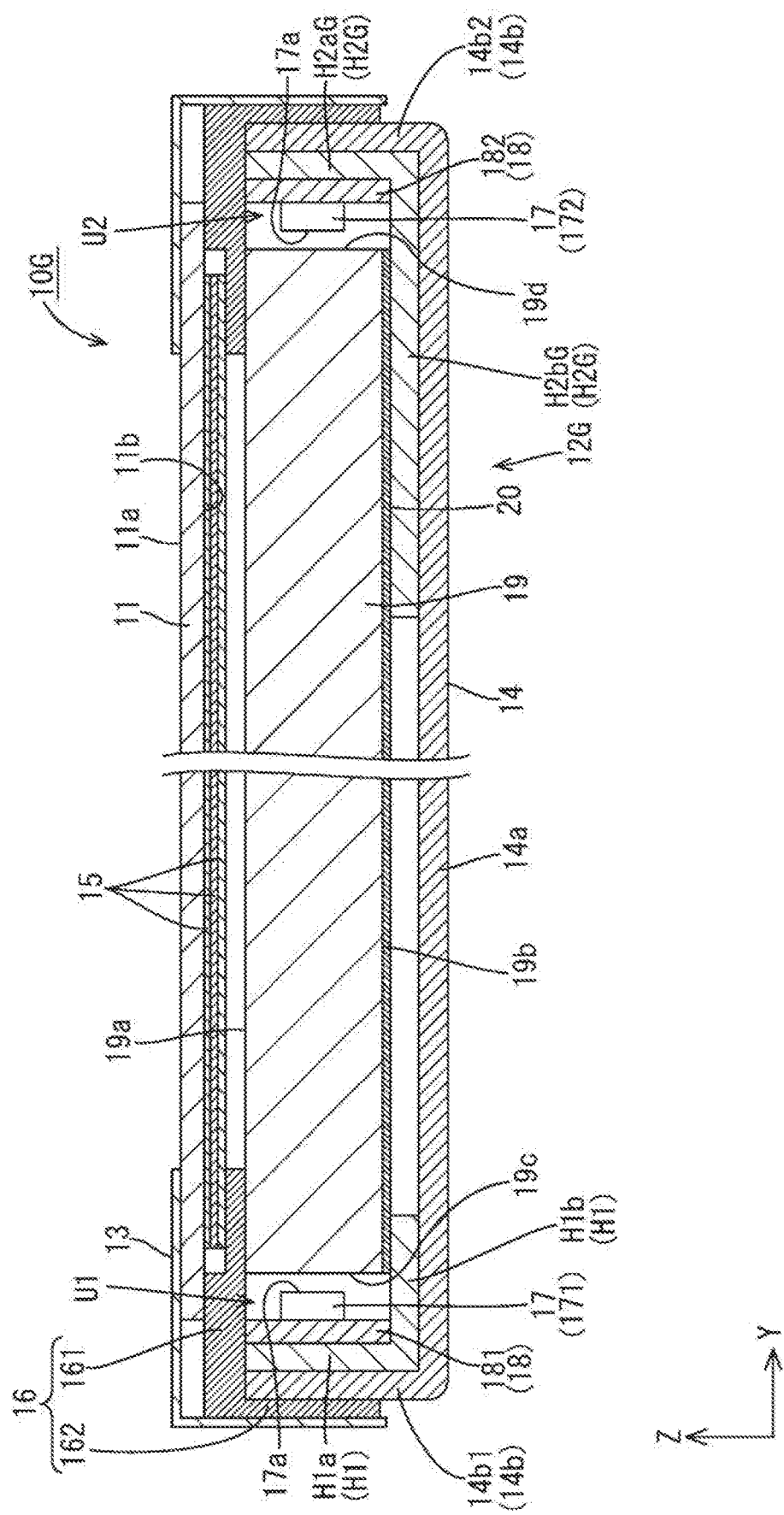
FIG. 13 is a cross-sectional view of a liquid crystal display apparatus according to Embodiment 7.

Next, a liquid crystal display apparatus 10G provided with a lighting device 12S according to Embodiment 7 will be described with reference to FIG. 13. FIG. 13 is a cross-sectional view of the liquid crystal display apparatus 10S according to Embodiment 7. The liquid crystal display apparatus 10S according to the present embodiment differs from the liquid crystal display apparatus 10 according to Embodiment 1 with regard to just the configuration of a second thermal dissipation member H2G that the lighting device 12S is provided with. The second thermal dissipation member H2G disposed at the upper edge side (light-incident face 19d side) of the light guide plate 19 is set so as to be larger in size (profile) than the first thermal dissipation member H1 disposed at the lower edge side (light-incident face 19c side) in the lighting device 12G according to the present embodiment. Specifically, the size of a plate-like second placement portion H2bG that the second thermal dissipation member H2G is provided with is set so as to be larger than the first placement portion H1b of the first thermal dissipation member H1. Note that a second upright wall portion H2aG of the second thermal dissipation member H2G is set so as to be the same size as the first upright wall portion H1a of the first thermal dissipation member H1. Increasing the size (profile) of the second thermal dissipation member H2G used at the upper edge side of the light guide plate 19 that tends to become hot, thereby increasing the area of contact between the second thermal dissipation member H2G and the chassis 14, as in the present embodiment, enables heat generated at the second LED unit U2 to be released externally (chassis 14, etc.), effectively using the second thermal dissipation member H2G. An arrangement may be made, such as in the present embodiment, where temperature difference between the lower edge side and upper edge side of the light guide plate 19 is suppressed by raising the thermal conduction efficiency of heat generated at the LEDs 17 of the second LED unit U2 at the upper edge side of the light guide plate 19. Note that in another embodiment, the profile and/or thickness (one of profile and thickness, or both of profile and thickness) of the second thermal dissipation member H2G may be made to be larger than the first thermal dissipation member H1.

Embodiment 8

Next, a lighting device according to Embodiment 8 will be described. The lighting device according to the present embodiment is an arrangement where electric power (LED current value) supplied to the LEDs of the second LED unit is smaller than electric power (LED current value) supplied to the LEDs of the first LED unit, in a lighting device having the same basic configuration as the lighting device 12 according to Embodiment 1 (the configuration of the first support substrate and the configuration of the second support substrate are the same). In the case of the present embodiment, the current supplied to each LED of the first LED unit disposed on the lower side of the light guide plate is 80 mA, and the current supplied to each LED of the second LED unit disposed on the upper side of the light guide plate is 70 mA. In this way, an arrangement may be made where heat generated at the LEDs in the second LED unit is made to be less than in the first LED unit side, to suppress temperature difference between the lower edge side and upper edge side of the light guide plate, by reducing the current supplied to the LEDs at the upper edge side of the light guide plate that tends to become hot.

Embodiment 9

Next, a lighting device according to Embodiment 9 will be described. The lighting device according to the present embodiment is a lighting device where normal two-sided adhesive tape (a first two-sided adhesive member with relatively low thermal conductance) is used when adhering the first LED board of the first LED unit to the first upright wall portion of the first thermal dissipation member (thermal dissipator), in a lighting device having the same basic configuration as the lighting device 12 according to Embodiment 1 (the configuration of the first support substrate and the configuration of the second support substrate are the same). As opposed to this, two-sided adhesive tape with thermal conductance (a second two-sided adhesive member with relatively high thermal conductance) is used when adhering the second LED board of the second LED unit to the second upright wall portion of the second thermal dissipation member (thermal dissipator). In this way, an arrangement may be made where efficient release of heat generated at the second LED unit to the second thermal dissipation member and so forth is facilitated by using two-sided adhesive tape having excellent thermal conductance (where a thermoconductive filler is dispersed in the adhesive agent layer, for example) for the two-sided adhesive tape to fix the second LED board at the upper edge side of the light guide plate that tends to become hot, so as to suppress temperature difference between the lower edge side and upper edge side of the light guide plate.

Embodiment 10

Figure 14:
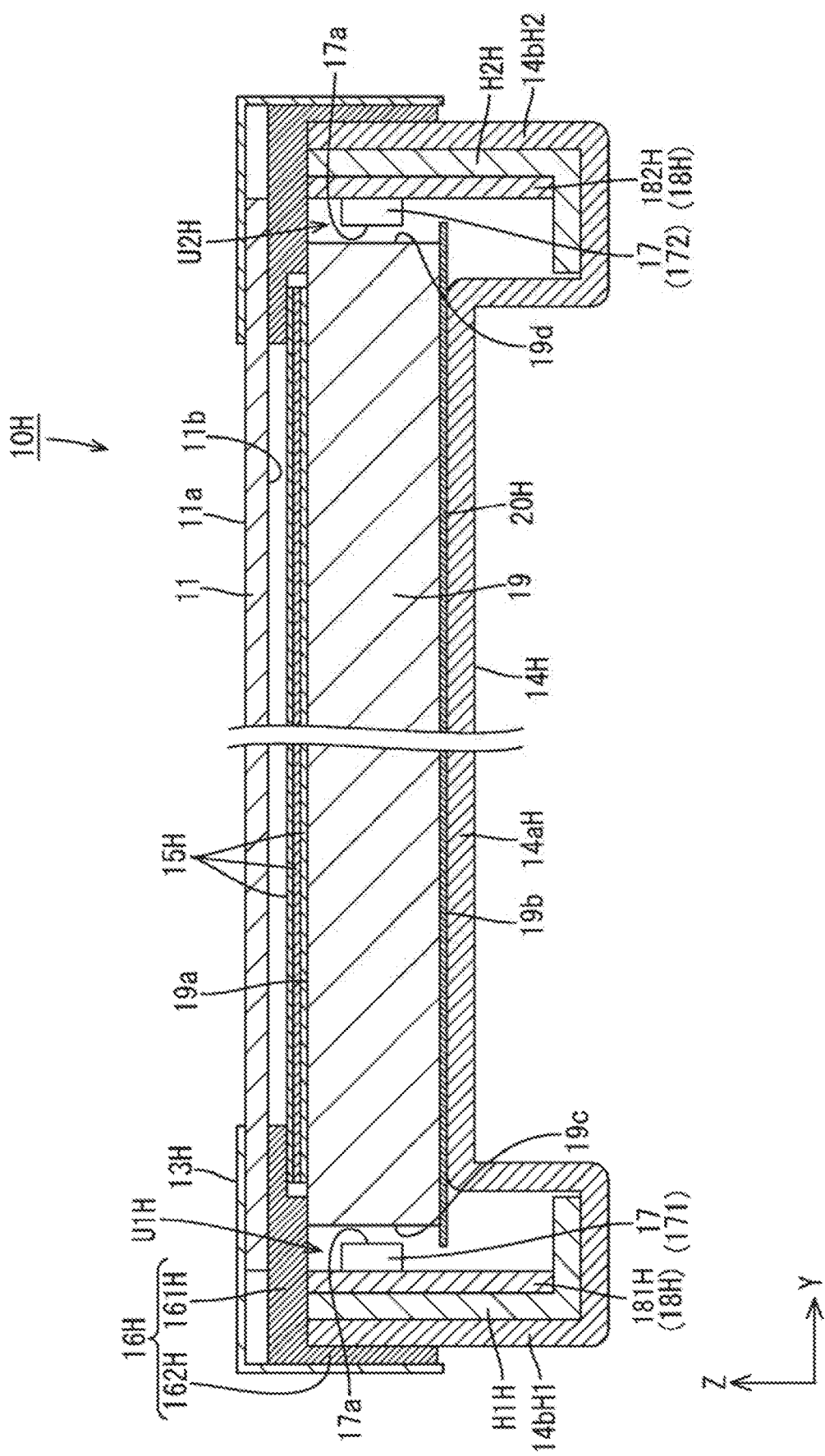
FIG. 14 is a cross-sectional view of a liquid crystal display apparatus according to Embodiment 10.

Next, a lighting device 10H according to Embodiment 10 will be described with reference to FIG. 14. In the lighting device 10H according to the present embodiment, the thickness of a second wiring portion (omitted from illustration) of a second LEI) board 182H that a second LED unit U2H is provided with is set to be larger than the thickness of a first wiring portion (thickness) of a first LED hoard 181H that a first LED unit U1H is provided with, in the same way as in Embodiment 1. Note that in the lighting device 10H according to the present embodiment, placements, forms, and so forth, of members such as an optical sheet 15H, a reflecting sheet 20H, and so forth, differ from Embodiment 1. Specifically, the optical sheet 15H according to the present embodiment is configured such that the optical sheet 15H is directly placed on the light-emitting face 19a of the light guide plate 19. Accordingly, the configuration is such that heat generated at the first LED unit U1H and second LED unit U2H is readily transferred to the optical sheet 15H via the light guide plate 19, air, and so forth, as compared to Embodiment 1 and so forth. A main frame portion 161H of a frame 16H is placed against the peripheral portion of the light-emitting face 19a of the light guide plate 19, with the portion of the inner rim side thereof that faces the light-emitting face 19a of the light guide plate 19 being recessed. The end portion of the optical sheet 15H that has been placed on the light guide plate 19 is accommodated in this recessed portion. An upright wall portion 162H of the frame 16H is provided on the outer rim side of the main frame portion 161H so as to encompass side wall portions of a chassis 14 from the outer side. Also, the reflecting sheet 20H is interposed between the rear face 19b of the light guide plate 19 and a bottom portion 14aH of the chassis 14. Also, portions 14bH1 and 14bH2 of the lower edge side and upper edge side of the chassis 14 each extend to the outer side beyond the bottom portion 14aH, with a first thermal dissipation member H1H holding the first LED unit U1H and a second thermal dissipation member H2H holding the second LED unit U2H being stored in the inner spaces thereof. The peripheral portion of the liquid crystal panel 11 is placed interposed between the main frame portion 161H of the frame 16H and a bezel 13H. Note the width of LED boards 18H (first LED board 181H and second LED board 182H) according to the present embodiment in the thickness direction of the lighting device 10H (Z-axial direction) is longer as compared with Embodiment 1, and the width of the first thermal dissipation member H1H and second thermal dissipation member H2H holding the LED boards 18H (width in the thickness direction of the lighting device 10H (Z-axial direction)) is also longer. Even if heat generated at the first LED unit U1H side situated below moves upwards by the chimney effect, heat generated at the second LED unit U2H situated above is efficiently eternally dissipated by operation of the second LED board 182H that has high thermal conduction efficiency (thermal dissipation efficiency) in the fighting device 10H according to the present embodiment. As a result, thermal expansion difference of the optical sheet 15H at the lower edge side and upper edge side is suppressed, and occurrence of wrinkles and warping of the optical sheet 15H can be suppressed.

Other Embodiments

The present invention is not restricted to the embodiments described above and described by way of the drawings, and embodiments such as the following, for example, are also encompassed by the technical scope of the present invention.

(1) In the above Embodiment 3, the first LED board used for the first LED unit may be a printed circuit board, and the second LED board used for the second LED unit may be an aluminum substrate, thereby raising the thermal conduction efficiency (thermal dissipation efficiency) at the upper edge side of the light guide plate that tends to become hot.

(2) In the above Embodiment 5, a multilayer substrate such as a four-layer substrate or the like may be used as the second LED board used for the second LED unit. Also, in other embodiments, with regard to the first LED board (first light source board) used for the first LED unit, the wiring portion is not restricted to a single-layer form and may be a multilayer form. In this case, a multilayer wiring portion that has a greater count of layers than the wiring portion of the first LED board will be used as the second LED board (second light source board) used for the second LED unit.

(3) A lighting device having a rectangular shape that is horizontally long in plan view has been exemplified in the above-described embodiments. However, lighting devices having other shapes may be made, such as a lighting device having a rectangular shape that is vertically long in plan view for example, insofar as this does not take away from the object of the present invention.

(4) In other embodiments, the display apparatus (liquid crystal display apparatus) may be a television receiver that has a tuner or the like, or may be digital signage or the like.

(5) In other embodiments, technology exemplified in the above-described Embodiments 1 through 9 and so forth may be applied to a lighting device of a configuration where an optical sheet is directly placed on a light-emitting face of a light guide plate, such as exemplified in the above-described Embodiment 10.

REFERENCE SIGNS LIST 10 display apparatus
12 lighting device
13 bezel
14 chassis
15 optical sheet
16 frame
17 light source
171 first light source row
172 second light source row
181 first light source board
81 first support substrate, second support substrate
82 first insulating layer, second insulating layer
83 first wiring portion
83A second wiring portion
182 second light source board
U1 first light source unit
U2 second light source unit

The invention claimed is:

1. A lighting device, comprising:
a first light source unit having a first light source row made up of a plurality of light sources aligned in a row, and a first light source board onto which the light sources making up the first light source row are mounted;
a second light source unit having a second light source row made up of a plurality of light sources aligned in a row, and a second light source board of thermal conduction efficiency higher than that of the first light source board, onto which the light sources making up the second light source row are mounted; and
a light guide plate having a plate-like shape and having a first light-incident face including an end face facing the first light source row, where light emitted from the light sources making up the first light source row is incident, and a second light-incident face disposed on an opposite side from the first light-incident face and including an end face facing the second light source row, where light emitted from the light sources making up the second light source row is incident, wherein
the first light source board has a first support substrate including a metal material, and
the second light source board has a second support substrate that includes a metal material, and that is larger in thickness than the first support substrate.

2. The lighting device according to claim 1, wherein
the first light source board has a first insulating layer formed on the first support substrate, and a first wiring portion formed on the first insulating layer, including metal foil, and electrically connected to the light sources making up the first light source row, and
the second light source board has a second insulating layer that is smaller in thickness than the first insulating layer, is of thermal resistance lower than that of the first insulating layer, and is formed on the second support substrate, and a second wiring portion formed on the second insulating layer, including metal foil, and electrically connected to the light sources making up the second light source row.

3. The lighting device according to claim 1, wherein the first light source board and the second light source board are of identical thickness,
the first light source board has a wiring portion having a single-layer or multilayer, including metal foil, and electrically connected to the light sources making up the first light source row, and
the second light source board has a wiring portion that has a multilayer and a larger count of layers than the wiring portion of the first light source board, and that includes metal foil and is electrically connected to the light sources making up the second light source row.

4. The lighting device according to claim 1, wherein the lighting device is used in a state where the light guide plate is erected with the second light source unit situated at an upper side, and the first light source unit situated at a lower side.

5. The lighting device according to claim 1, wherein the first light source board has a first wiring portion including metal foil and electrically connected to the light sources making up the first light source row, and
the second light source board has a second wiring portion that includes metal foil and is electrically connected to the light sources making up the second light source row, and that is larger in thickness than the first wiring portion.

6. A lighting device, comprising:
a first light source unit having a first light source row made up of a plurality of light sources aligned in a row, and a first light source board onto which the light sources making up the first light source row are mounted;
a second light source unit having a second light source row made up of a plurality of light sources aligned in a row, and a second light source board of thermal conduction efficiency higher than that of the first light source board, onto which the light sources making up the second light source row are mounted; and
a light guide plate having a plate-like shape and having a first light-incident face including an end face facing the first light source row, where light emitted from the light sources making up the first light source row is incident, and a second light-incident face disposed on an opposite side from the first light-incident face and including an end face facing the second light source row, where light emitted from the light sources making up the second light source row is incident, wherein
the first light source board has a first support substrate, and
the second light source board has a second support substrate including a material of thermal conductivity higher than that of the first light source board.

7. The lighting device according to claim 6, wherein the first light source board has a first wiring portion including metal foil and electrically connected to the light sources making up the first light source row, and
the second light source board has a second wiring portion that includes metal foil and is electrically connected to the light sources making up the second light source row, and that is larger in thickness than the first wiring portion.

8. The lighting device according to claim 6, wherein the first light source board has a first insulating layer formed on the first support substrate, and a first wiring portion formed on the first insulating layer, including metal foil, and electrically connected to the light sources making up the first light source row, and
the second light source board has a second insulating layer that is smaller in thickness than the first insulating layer, is of thermal resistance lower than that of the first insulating layer, and is formed on the second support substrate, and a second wiring portion formed on the second insulating layer, including metal foil, and electrically connected to the light sources making up the second light source row.

9. The lighting device according to claim 6, wherein the first light source board and the second light source board are of identical thickness,
the first light source board has a wiring portion having a single-layer or multilayer, including metal foil, and electrically connected to the light sources making up the first light source row, and
the second light source board has a wiring portion that has a multilayer and a larger count of layers than the wiring portion of the first light source board, and that includes metal foil and is electrically connected to the light sources making up the second light source row.

10. The lighting device according to claim 6, wherein the lighting device is used in a state where the light guide plate is erected with the second light source unit situated at an upper side, and the first light source unit situated at a lower side.

11. A lighting device, comprising:
a first light source unit having a first light source row made up of a plurality of light sources aligned in a row, and a first light source board onto which the plurality of light sources making up the first light source row are mounted;
a second light source unit having a second light source row made up of a plurality of light sources aligned in a row, and a second light source board onto which the plurality of light sources making up the second light source row are mounted, the second light source unit having a thermal dissipation property higher than that of the first light source unit; and
a light guide plate having a plate-like shape and having a first light-incident face including an end face facing the first light source row, where light emitted from the plurality of light sources making up the first light source row is incident, and a second light-incident face disposed on an opposite side from the first light-incident face and including an end face facing the second light source row, where light emitted from the light sources making up the second light source row is incident, and
wherein the first light source unit has a first two-sided adhesive member for adhering the first light source board to a thermal dissipator, and
wherein the second light source unit has a second two-sided adhesive member of thermal conductance higher than that of the first two-sided adhesive member and for adhering the second light source board to a thermal dissipator from a lighting device according.

12. The lighting device according to claim 11, wherein
the first light source unit has a first thermal dissipation member that holds the first light source board, and
the second light source unit has a second thermal dissipation member that has a larger profile and/or thickness than the first thermal dissipation member, and that holds the second light source board.

* * * * *